United States Patent [19]
Link et al.

[11] Patent Number: 5,985,018
[45] Date of Patent: Nov. 16, 1999

[54] ANTI-SKINNING AGENTS FOR OXIDATIVELY DRYING COATING COMPOSITIONS

[75] Inventors: Günter Link, Goslar; Dirk Edelmann, Wuppertal, both of Germany

[73] Assignee: Borchers GmbH, Monheim, Germany

[21] Appl. No.: 09/154,959

[22] Filed: Sep. 17, 1998

[30] Foreign Application Priority Data

Sep. 22, 1997 [DE] Germany .................. 197 41 644

[51] Int. Cl.$^6$ .................................. C09D 7/04
[52] U.S. Cl. ............... 106/287.25; 106/263; 106/287.24; 106/310; 106/316; 252/403; 252/407
[58] Field of Search .................. 106/263, 287.24, 106/287.25, 310, 316; 252/403, 407

[56] References Cited

U.S. PATENT DOCUMENTS 3,686,012  8/1972  Fischer ..................... 106/310

*Primary Examiner*—David Brunsman
*Attorney, Agent, or Firm*—Joseph C. Gil; Thomas W. Roy

[57] ABSTRACT

The present invention relates to coating compositions containing oxidatively drying binders and anti-skinning agents corresponding to formula (Ia) or (Ib)

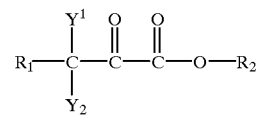

(Ia)

-continued

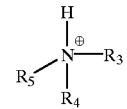
(Ib)

wherein $Y_1$ and $Y_2$ are the same or different and represent hydrogen, chlorine or fluorine, $X^\oplus$ represents a group corresponding to formula I

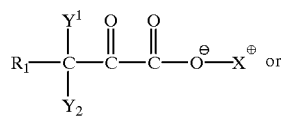
(I)

and $R_1$, $R_2$, $R_3$, $R_4$ and $R_5$ are the same or different and represent hydrogen, a $C_1$–$C_{10}$ linear or branched alkyl group that may contain one or more hydroxy groups, an aryl group or a $C_5$–$C_7$ cycloalkyl group.

The present invention also relates to anti-skinning agent mixtures containing these anti-skinning agents.

8 Claims, No Drawings

ANTI-SKINNING AGENTS FOR OXIDATIVELY DRYING COATING COMPOSITIONS

BACKGROUND OF THE INVENTION

1. Field of the Invention

The present invention relates to oxidatively drying coating compositions containing oxocarboxylic acids or derivatives thereof and optionally dioxo compounds as anti-skinning agents and to improve drying of the resulting coatings (lacquer films).

2. Description of the Prior Art

Oils and binders are known that are converted from the liquid phase to the solid phase by oxidative crosslinking under the action of oxygen (preferably from the air) at room temperature or at higher temperatures in the presence of drying agents, for example, metal soaps of transition metals. Solutions of these drying agents are known as "siccatives." One difficulty of these oils and binders is that a skin may form on their surface during storage (in open or sealed containers). This crosslinking, which proceeds before the actual application of the lacquer, is highly undesirable. For example, it complicates handling of the lacquer and very frequently prevents the uniform distribution of the siccatives. One cause of skinning is the accumulation of siccatives at the surface. This is detrimental because the incorporation of the siccatives into the lacquer skin removes the necessary active siccatives from the remainder of the lacquer, which severely delays drying.

Skinning is also unwanted and disadvantageous in an applied lacquer film. Excessively rapid drying at the lacquer surface prevents uniform hard drying of the film because the underlying layers of the film are shielded from the oxygen necessary for drying. Uniform distribution of the oxygen is prevented by the excessively rapid surface drying resulting in levelling problems, shrinkage, adhesion problems and/or overall inadequate film hardness of the lacquer films.

In accordance with the prior art it is necessary to add substances (anti-oxidants or anti-skinning agents) to the coating compositions which inhibit the reaction with atmospheric oxygen at the (lacquer) liquid surface, i.e., in the container and in the applied film. A list of these known compounds is set forth in H. Kittel, Lehrbuch der Lacke und Beschichtung, Colomb Verlag, 1976.

The preferred anti-skinning agents are phenolic compounds and oximes. However, phenolic anti-skinning agents considerably delay surface drying, such that they may only be considered for specific coating compositions. Due to their volatility oximes, such as methyl ethyl ketoxime, only slightly delay surface drying. The disadvantage of oximes, which are today widely used, is their toxicity. Animal studies have indicated a risk of carcinogenicity on exposure by inhalation (MAK [German maximum admissible concentration]) list 1997). Therefore, elaborate personal protection measures are required when applying lacquers containing oximes as anti-skinning agents.

An object of the present invention is to provide anti-skinning agents which 1) either do not or only very slightly delay surface drying, 2) allow for very good hard drying of the lacquer and 3) have no disadvantageous toxicological properties. An additional object of the present invention is to provide anti-skinning agents which may be incorporated into a wide variety of oxidatively drying lacquers. Another object is to provide additives which, by virtue of their physical properties, may straightforwardly be used in suitable lacquer formulations.

These objects may be achieved with the compounds according to the present invention, which are described hereinafter.

SUMMARY OF THE INVENTION

The present invention relates to coating compositions containing oxidatively drying binders and anti-skinning agents corresponding to formula (Ia) or (Ib)

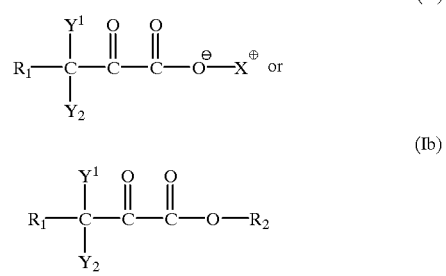

wherein $R_1$ and $R_2$ are the same or different and represent hydrogen, a $C_1$–$C_{10}$ linear or branched alkyl group that may contain one or more hydroxy groups, an aryl group or a $C_5$–$C_7$ cycloalkyl group, $Y_1$ and $Y_2$ are the same or different and represent hydrogen, chlorine or fluorine and $X^\oplus$ represents a group corresponding to formula I

wherein $R_3$, $R_4$ and $R_5$ are the same or different and represent hydrogen, a $C_1$–$C_{10}$ linear or branched alkyl group that may contain one or more hydroxy groups, an aryl group or a $C_5$–$C_7$ cycloalkyl group.

The present invention also relates to anti-skinning agent mixtures containing the anti-skinning agents of formula Ia or Ib in admixture with compounds corresponding to formula (II)

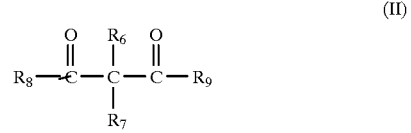

or formula (III)

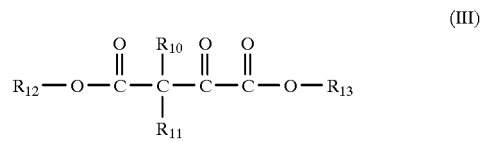

wherein $R_6$ and $R_7$ are the same or different and represent hydrogen or a $C_1$–$C_4$ alkyl group and $R_8$, $R_9$, $R_{10}$, $R_{11}$, $R_{12}$ and $R_{13}$ are the same or different and represent hydrogen, a $C_1$–$C_4$ alkyl group, an aryl group or a $C_5$–$C_7$ cycloalkyl group.

DETAILED DESCRIPTION OF THE INVENTION

It is essential to the invention that only those mixtures containing at least 1 wt. % of a compound of formula (Ia) or (Ib) are used as anti-skinning agents, based on the weight of the anti-skinning agent mixture. According to the invention, the compounds of formulas (II) and (III) are used in combination with the anti-skinning agents of formulas (Ia) and/or (Ib).

The use of the compounds of formula (Ia) or (Ib) alone or in the form of solutions in organic solvents is also possible according to the invention. Any known solvents for use in oxidatively drying compositions may be used, such as aromatics, mineral spirits, ketones and alcohols. However, a mixture of the compounds of formulas (Ia) and/or (Ib) with the compounds of formulas (II) and/or (III) is preferred.

The compounds or mixtures may be used in pure form or in the form of solutions in organic solvents. They may also be used in the form of aqueous dispersions or emulsions. In this regard "aqueous" is intended to mean that water is either the sole solvent or is present in admixture with conventional solvents in an amount of greater than 50 wt. %, based on the total weight of solvent.

The quantity of the anti-skinning agents to be used is determined primarily by the quantity of siccatives used in the coating compositions. Preferably at least 1 mole, more preferably 1 to 6 moles, of the compounds of formulas (Ia) and (Ib) should be added per mole of metal used of the primary drier or the primary driers when combinations of driers are used. Preferably at least 1 mole, more preferably 1 to 6 moles, of the compounds of formulas (II) or (III) are also added.

The especially preferred quantities used are highly dependent upon the nature of the binder and pigments used. Therefore, in unpigmented lacquers based on long-oil alkyd resins, 1.5 to 3 moles of compounds of formula (Ia) and (Ib) are used in admixture with 3 to 6 moles of compounds of formula (II), based on the quantity of primary drier metal used. Preferably, the anti-skinning agents are present in an amount of 0.05 to 1 wt. %, based on the weight of the coating composition.

One advantage of the anti-skinning agents described in this application is that they prevent skinning in a wide variety of binders and in the presence of various siccatives, but have no negative effect on other drying characteristics of the coating. In some binder compositions, especially when compounds of the formula (III) are used, the surface and hard drying of the coatings may be distinctly improved.

The oxidatively drying coating compositions include clear and pigmented lacquers. Suitable oxidatively drying binders include oxidatively drying oils, alkyd resins, epoxy esters and other oxidatively drying, refined oils. The presence of the anti-skinning agents according to the invention also improves the hard drying, levelling and gloss of resulting coatings.

The invention is further illustrated but is not intended to be limited by the following examples in which all parts and percentages are by weight unless otherwise specified.

EXAMPLES

1) Embodiments

The following embodiments represent suitable anti-skinning agents and mixtures containing suitable anti-skinning agents according to the invention.

a) 100 wt. % 2-oxopropionic acid
b) 50 wt. % 2-oxopropionic acid; 45 wt. % mineral spirits K60; 5 wt. % n-butanol
c) 50 wt. % 2-oxobutyric acid; 45 wt. % mineral spirits K60; 5 wt. % n-butanol
d) 50 wt. % 2-oxovaleric acid; 45 wt. % mineral spirits K60; 5 wt. % n-butanol
e) 22.6 wt. % 2-oxopropionic acid; 77.2% 2,4-pentadione
f) 12.8 wt. % 2-oxopropionic acid; 87.2% 2,4-pentadione
g) 30.3 wt. % 2-oxopropionic acid; 69.7 wt. % 2-methyl-3-oxosuccinic acid diethyl ester
h) 39.5 wt. % 2-oxopropionic acid; 60.5 wt. % 2-methyl-3-oxosuccinic acid diethyl ester
i) 46.5 wt. % 2-oxopropionic acid; 53.5 wt. % 2-methyl-3-oxosuccinic acid diethyl ester
j) 12.3 wt. % 2-oxopropionic acid; 57.5% 2,4-pentadione; 30.2 wt. % 2-methyl-3-oxosuccinic acid diethyl ester
k) 50.0 wt. % 2-oxopropionic acid N,N-dimethyl-N-2-hydroxylammonium salt; 50 wt. % 2,4-pentadione 2) Oxidatively drying compositions containing the anti-skinning agents according to the invention a) 0.099 g of composition 1e) were added to a mixture of 40.0 g of a short-oil alkyd resin (Alkydal F26X from Bayer), 3.6 g of xylene, 1.0 g of n-butanol, 5.2 g of mineral spirits K60 and 0.200 g of a siccative (Drier 69 from Borchers; 6 wt. % Co). Skinning was prevented for more than 20 days in an open test tube (160×16 mm; initial weight 5.0). The drying time of the resulting coating (wet film thickness 100 μm) was 2.0 h (determined according to DIN 53150). In comparison, the skinning time without addition of the anti-skinning additives according to the invention measured under identical conditions was 4 days. The drying time of a coating, measured under identical conditions, without addition of the anti-skinning agent was 5 h.

b) 0.100 g of composition 1h) were mixed with 40.0 g of a short-oil alkyd resin (Alkydal F26X from Bayer), 3.6 g of xylene, 1.0 g of n-butanol, 5.2 g of mineral spirits K60 and 0.200 g of a siccative (Drier 69 from Borchers; 6 wt. % Co). Skinning was prevented for more than 17 days in an open test tube (160×16 mm; initial weight 5.0). In comparison, the skinning time without addition of the additive was 4 days. The drying time of the resulting coating (wet film thickness 100 μm) was 5 h (determined according to DIN 53150). König pendulum hardness (determined according to DIN 53150) was 105 s after 48 h and 143 s after 72 h. In comparison, the pendulum hardness of a coating, determined under identical conditions, without the anti-skinning additive was 74 s after 48 h and 80 s after 72 h.

c) 0.120 g of composition 1g) were added to a mixture of 40.0 g of a medium-oil alkyd resin (Alkydal F48TB from Bayer), 3.6 g of xylene, 1.0 g of n-butanol, 5.2 g of mineral spirits K60 and 0.185 g of a siccative (Drier 69 from Borchers; 6 wt. % Co). Skinning was prevented for more than 17 days in an open test tube (160×16 mm; initial weight 5.0). In comparison, the skinning time of the coating composition without the anti-skinning agent was 2 days. The drying time of the resulting coating (wet film thickness 100 μm) was 4 h (determined according to DIN 53150). The drying time of a coating without anti-skinning additive was also 4 hours under identical conditions. König pendulum hardness (determined to DIN 53150) of the coating according to the invention was 75 s after 48 h drying time and 94 s after 72 h. The pendulum hardness, determined under identical conditions, of a comparison coating without the additive was 67 s after 48 h drying time and 67 s after 72 h drying time.

d) 0.093 g of a composition 1f) were added to a mixture of 40.0 g of a medium-oil alkyd resin (Alkydal F48TB from Bayer), 3.6 g of xylene, 1.0 g of n-butanol, 5.2 g of mineral spirits K60 and 0.185 g of a siccative (Drier 69 from Borchers; 6 wt. % Co). Skinning was prevented for more than 15 days in an open test tube (160×16 mm; initial weight 5.0). The drying time of the resulting coating (wet film thickness 100 μm) was 5 h (determined according to DIN 53150). The König pendulum hardness (determined to DIN 53150) of the coating 43 s after 24 h drying time, 68 s after 48 h drying time and 89 s after 72 h drying time. These values represent an improvement in hard drying when compared to the comparison coating without additive from Example c).

e) 0.075 g of composition 1e) were added to a mixture of 40.0 g of a long-oil alkyd resin (Alkydal F681TB from Bayer), 3.6 g of xylene, 1.0 g of n-butanol, 5.3 g of mineral spirits K60, 0.125 g of a first siccative (Drier 69 from Borchers; 6 wt. % Co) and 0.64 g of a second siccative (Octa-Soligen Ca-10 from Borchers; 10 wt. % Ca). Skinning was prevented for more than 20 days in an open test tube (160×16 mm; initial weight 5.0). In comparison, the skinning time of the coating composition without anti-skinning agent was 3 days. The drying time of the resulting coating (wet film thickness 100 μm) with anti-skinning additive was 9 h (determined according to DIN 53150). The drying time of a comparison coating without the anti-skinning additive was 8 hours under identical conditions.

f) 0.16 g of composition 1k) were added to a mixture of 40.0 g of a long-oil alkyd resin (Alkydal F681TB from Bayer), 4.6 g of xylene, 1.0 g of n-butanol, 4.0 g of mineral spirits K60, 0.10 g of a first siccative (Octa-Soligen CO-6 from Borchers) and 0.30 g of a second siccative (Octa-Soligen CO10 from Borchers). 5.0 of the lacquer mixture were weighed out into an open test tube (160×16 mm). Skinning was prevented for more than 21 days in an open test tube (160×16 mm; initial weight 5.0). The drying time, measured with a needle track apparatus (drying recorder), of the resulting coating (wet film thickness 100 μm) with anti-skinning agent was 5.0 h. The drying time of the comparison coating without the anti-skinning additive was also 5.0 h.

g) 14.0 g of $CaCO_3$, 20.0 g of zinc white (zinc oxide), 3.0 g of xylene, 1.0 g of n-butanol, 0.35 g of Borchigen ND (Borchers) and 5.0 g of mineral spirits K60 were added to 30.0 g of a long-oil alkyd resin (Alkydal F681TB from Bayer). This lacquer mixture was mixed with 0.15 g of a first siccative (Drier 69 from Borchers; 6 wt. % Co) and 0.50 g of a second siccative (Octa-Soligen Ca-10 from Borchers; 10 wt. % Ca) and then combined with 0.077 g of composition 1e). Skinning was prevented for more than 17 days in an open test tube (160×16 mm; initial weight 5.0). The skinning time of the mixture without the anti-skinning additive was 1 day under identical conditions. The drying time of the resulting coating (wet film thickness 100 μm) with anti-skinning agent was 4 h (determined according to DIN 53150). The drying time of a comparison coating without the anti-skinning agent was 3.5 h under identical conditions. The König pendulum hardness (determined according to DIN 53170) of the coating according to the invention was 35 s after 24 h drying time, 48 s after 49 h and 64 s after 72 h. The König pendulum hardness of the comparison coating without the anti-skinning additive was 32 s after 24 h, 46 s after 49 h and 55 s after 72 h measured under identical conditions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition containing an oxidatively drying binder and an anti-skinning agent corresponding to formula (Ia) or (Ib)

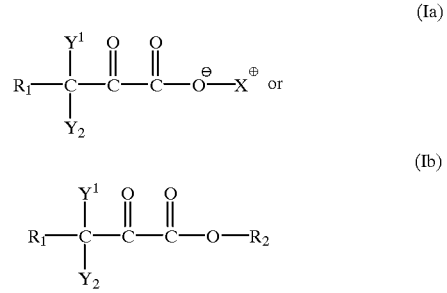

wherein $R_1$ and $R_2$ are the same or different and represent hydrogen, a $C_1$–$C_{10}$ linear or branched alkyl group that may contain one or more hydroxy groups, an aryl group or a $C_5$–$C_7$ cycloalkyl group, $Y_1$ and $Y_2$ are the same or different and represent hydrogen, chlorine or fluorine and $X^\oplus$ represents a group corresponding to formula I

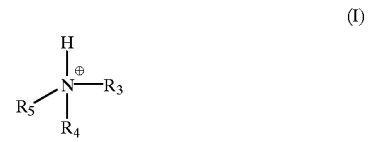

wherein $R_3$, $R_4$ and $R_5$ are the same or different and represent hydrogen, a $C_1$–$C_{10}$ linear or branched alkyl group that may contain one or more hydroxy groups, an aryl group or a $C_5$–$C_7$ cycloalkyl group.

2. The coating composition of claim 1 which additionally contains a compound corresponding to formula (II)

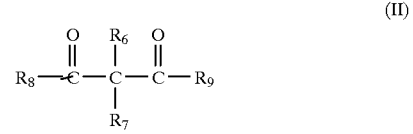

wherein $R_6$ and $R_7$ are the same or different and represent hydrogen or a $C_1$–$C_4$ alkyl group and $R_8$ and $R_9$ are the same or different and represent hydrogen, a $C_1$–$C_4$ alkyl group, an aryl group or a $C_5$–$C_7$ cycloalkyl group.

3. The coating composition of claim 2 which additionally contains a compound corresponding to formula (III)

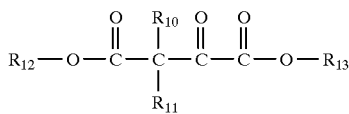

(III)

wherein

R$_{10}$, R$_{11}$, R$_{12}$ and R$_{13}$ are the same or different and represent hydrogen, a C$_1$–C$_4$ alkyl group, an aryl group or a C$_5$–C$_7$ cycloalkyl group.

4. The coating composition of claim 1 which additionally contains a compound corresponding to formula (III)

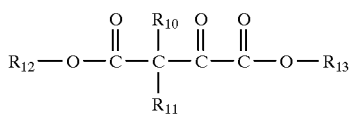

(III)

wherein

R$_{10}$, R$_{11}$, R$_{12}$ and R$_{13}$ are the same or different and represent hydrogen, a C$_1$–C$_4$ alkyl group, an aryl group or a C$_5$–C$_7$ cycloalkyl group.

5. The coating composition of claim 1 wherein the anti-skinning agent is dissolved in an organic solvent.

6. The coating composition of claim 1 wherein the anti-skinning agent is present in an amount of 0.05 to 1 wt. %, based on the weight of the coating composition.

7. An anti-skinning agent composition containing

A) an anti-skinning agent corresponding to formula (Ia) or (Ib)

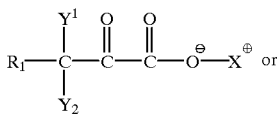

(Ia)

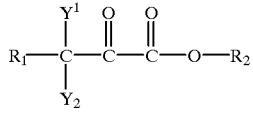

(Ib)

wherein

R$_1$ and R$_2$ are the same or different and represent hydrogen, a C$_1$–C$_{10}$ linear or branched alkyl group that may contain one or more hydroxy groups, an aryl group or a C$_5$–C$_7$ cycloalkyl group, Y$_1$ and Y$_2$ are the same or different and represent hydrogen, chlorine or fluorine and X$^\oplus$ represents a group corresponding to formula I

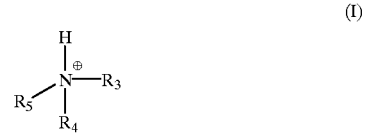

(I)

wherein

R$_3$, R$_4$ and R$_5$ are the same or different and represent hydrogen, a C$_1$–C$_{10}$ linear or branched alkyl group that may contain one or more hydroxy groups, an aryl group or a C$_5$–C$_7$ cycloalkyl group and either B) a compound corresponding to formula (II)

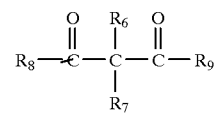

(II)

wherein

R$_6$ and R$_7$ are the same or different and represent hydrogen or a C$_1$–C$_4$ alkyl group and R$_8$ and R$_9$ are the same or different and represent hydrogen, a C$_1$–C$_4$ alkyl group, an aryl group or a C$_5$–C$_7$ cycloalkyl group, or C) a compound corresponding to formula (III)

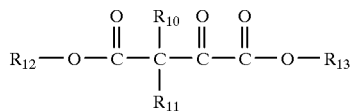

(III)

wherein

R$_{10}$, R$_{11}$, R$_{12}$ and R$_{13}$ are the same or different and represent hydrogen, a C$_1$–C$_4$ alkyl group, an aryl group or a C$_5$–C$_7$ cycloalkyl group.

8. The anti-skinning composition of claim 7 wherein both compounds B) and C) are present.

* * * * *